April 4, 1944.   B. G. CARLSON   2,345,915
DIRECTIONAL GYRO INSTRUMENT
Filed July 28, 1942   2 Sheets-Sheet 2

INVENTOR.
BERT G. CARLSON.
BY
Frank H. Harmon
ATTORNEY.

Patented Apr. 4, 1944

2,345,915

UNITED STATES PATENT OFFICE 2,345,915

DIRECTIONAL GYRO INSTRUMENT

Bert G. Carlson, Erieside, Ohio, assignor to Jack & Heintz, Inc., Bedford, Ohio, a corporation of Ohio Application July 28, 1942, Serial No. 452,607

4 Claims. (Cl. 33—204)

This invention relates in general to directional gyro instruments and has for its primary objects the elimination of friction in the moving parts and the provision of means inherent in the assembly for automatic correction and return to proper normal balance from upset relationships caused by gyro precession or wandering.

To these ends it is proposed to provide the gyro compass with two directional gyro rotors and to spin them with pressure oil which not only efficiently lubricates all of the bearings by force feed lubrication but also, through jets placed adjacent each rotor, spins the latter uniformly when in normal position and corrects against precession or wandering by increasing the pressure fluid load on that rotor located in the direction towards which the rotors have moved from normal position so as to return the assembly to normal position.

With the foregoing and other objects in view, the invention resides in the combination of parts and in the details of construction hereinafter set forth in the following specification and appended claims, certain embodiments being illustrated in the accompanying drawings, in which:

Figure 1:
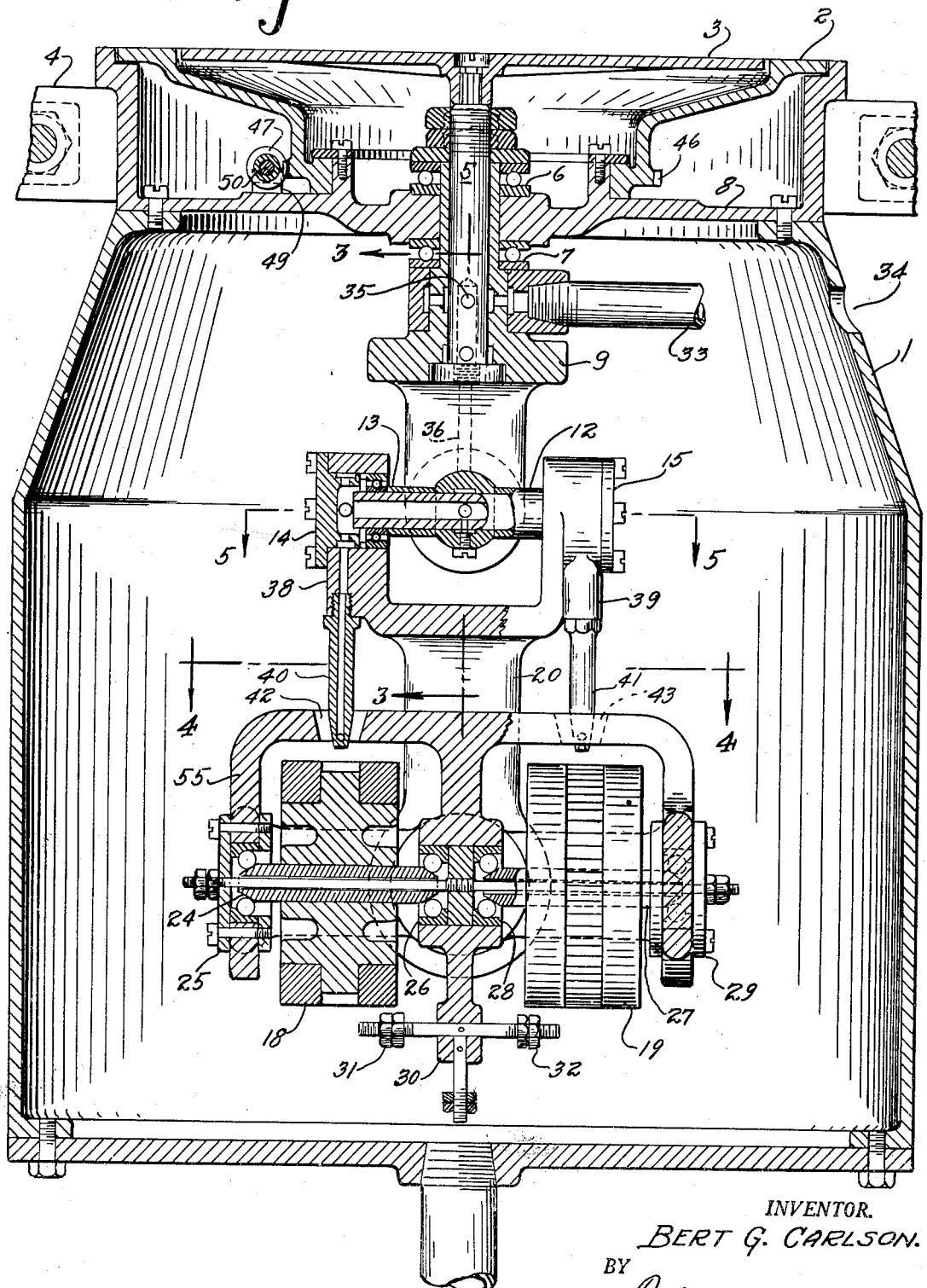
Figure 1 is a view in vertical section taken through the directional gyro instrument assembly.

Referring more particularly to the drawings, the directional gyro instrument assembly is provided with a housing 1, an adjustable dial 2 and a pointer 3, the housing being carried by a support 4.

The pointer is carried by the upper end of a hollow shaft 5 so as to be fully rotatable in the upper and lower bearing assemblies 6 and 7 supported by the plate 8 that is secured to the housing. Keyed to the shaft 5 is a support 9 which terminates at its lower portion in four radially extending arms 10, 11, 12 and 13 mounted in bearing assemblies 14, 15, 16 and 17, respectively, to form a universal suspension joint for supporting the rotor assembly. The two gyro rotors 18 and 19 are carried by a gimbal frame 55 supported by a frame consisting of arms 20 and 21 depending from the universal suspension joint and are mounted respectively in bearing assemblies 22 and 23 in gimbal frame 55 for rotation about an axis defined by the bearing assemblies 22 and 23 or in other words to the left and to the right as viewed in Figure 1. The directional gyro rotor 18 is mounted for spinning about a horizontal axis defined by its pivot 24 in its bearing assemblies 25 and 26 while directional gyro rotor 19 is also mounted to rotate about a horizontal axis defined by its pivot 27 and its bearing assemblies 28 and 29. The depending element 30 is provided with adjustable counterweights 31 and 32 in order to erect the device in a truly perpendicular attitude under normal conditions.

As previously stated one of the primary objects of the present invention is to provide a suitable directional gyro instrument and to eliminate all possibility of friction between the moving parts which otherwise would bring about undue precession and wandering of the assembly in actual operation. In order to accomplish this it is proposed to have the directional gyros spun by pressure oil and to utilize this pressure oil for thorough and efficient force feed lubrication of all the parts. Accordingly, the pressure oil is fed from some suitable source through an intake pipe 33 extending through an opening 34 in the housing and into ports 35 into the interior of the hollow shaft 5. From here the pressure oil is forced through passages in the supporting element 9 and through passages 36 and 37 and through hollow passages in the arms 10, 11, 12 and 13 to the bearings 14, 15, 16 and 17. Communicating with bearings 15 and 17 are ports 38 and 39 that communicate with hollow jets 40 and 41. These jets extend through openings 42 and 43 in gimbal frame 55 so as to be adjacent to the buckets 44 and 45 of the rotors 19 and 18, respectively.

Figure 1 shows the directional gyro instrument in normal gravitational perpendicular position in which case the pressure oil is forced in uniform amounts and at uniform pressure through the jets 40 and 41 to a gyro 18 and 19, respectively. Under such conditions each gyro will be spun at an equal rate of speed and the pressure load of each will be the same so as to maintain the assembly in the normal position shown in Figure 1. In the event, however, of precession or wandering of the gyro assembly either to the left or to the right as viewed in Figure 1 or in other words about its bearings 22 and 23, one gyro rotor will be moved closer to its pressure oil jet while the other will be moved further away from its corresponding jet. In other words when the gyro assembly precesses or wanders to the left, as viewed in Figure 1, the entire depending structure supported by a supporting element 9 moves clockwise about arms 10 and 12 in their corresponding bearings 14 and 16. In addition to this movement the gyro rotors and their supporting gimbal ring move in a clockwise direction in the bearings 22 and 23. The net result of this movement is to bring about a closer relationship between the rotor 18 and its buckets 44 with the jet 40 while conversely the buckets 45 of rotor 19 are correspondingly further removed from the outlet of the pressure oil jet 41. This brings about a greater oil pressure on the buckets of rotor 18 and consequently an imposition of a relatively greater load while decreasing that on the buckets 45 of rotor 19. The effect is to automatically rotate the gyro rotor assembly in a counterclockwise direction until the normal vertical relationship, as shown in Figure 1, is again resumed. The converse is obviously the case if the gyro rotor assembly precesses or wanders to the right, as shown in Figure 1, or in other words in a counterclockwise direction in which case a greater relative load is imposed upon the rotor 19 so as to rotate the assembly in a clockwise direction until the normal vertical relationship is accomplished.

As will be seen from the foregoing there has been provided a directional gyro assembly in which all of the relative moving parts are literally bathed in pressure oil by force feed lubrication at all times so as to eliminate friction while rendering the device movable in three degrees of freedom. The force feed pressure oil system in addition to constituting an effective and efficient lubricating system for the assembly constitutes the impelling force for the spinning of the rotors. The purpose of using the two rotors instead of one is to obtain, by reason of the novel arrangement shown in the drawings, an automatic means for self-righting of the assembly which means constitutes merely the pressure oil driving means and without the necessity of the usual and conventional additional mechanical and electrical restraining devices.

Figure 2:
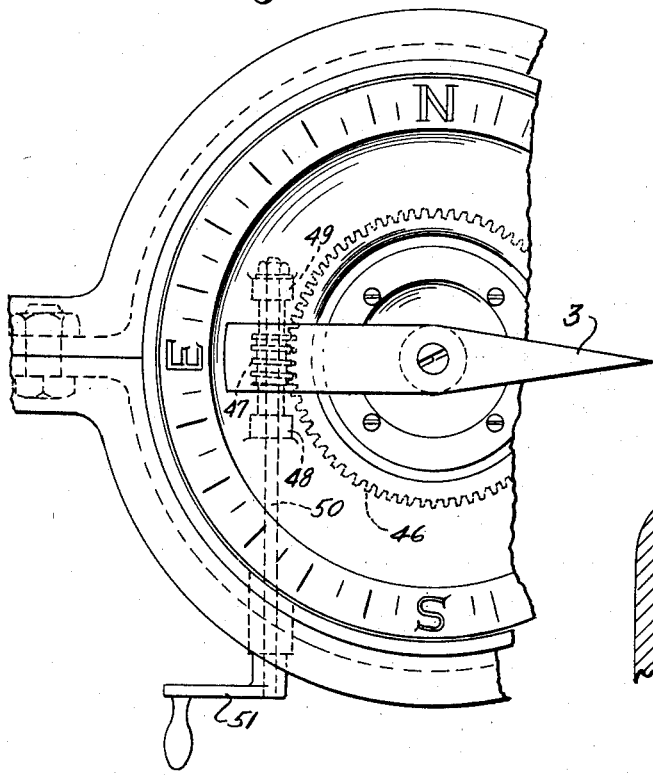
Figure 2 is a partial top plan view of the compass dial and mechanism for setting the same.
Figure 3:
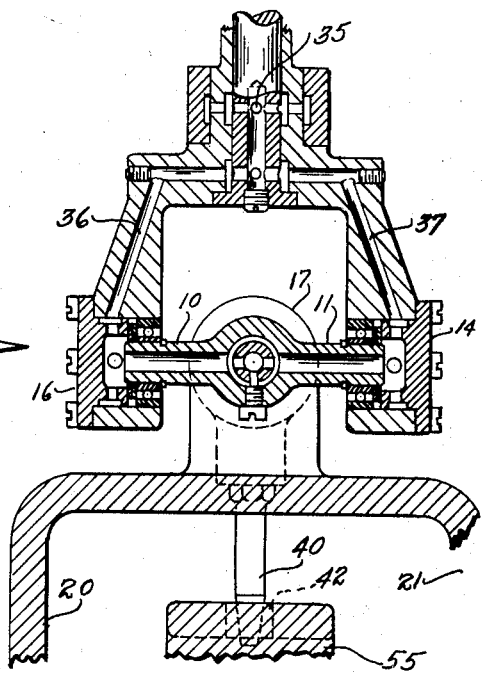
Figure 3 is a view in vertical section taken along line 3—3 of Figure 1 showing the universal suspension joint, its bearings and oil supply.
Figure 4:
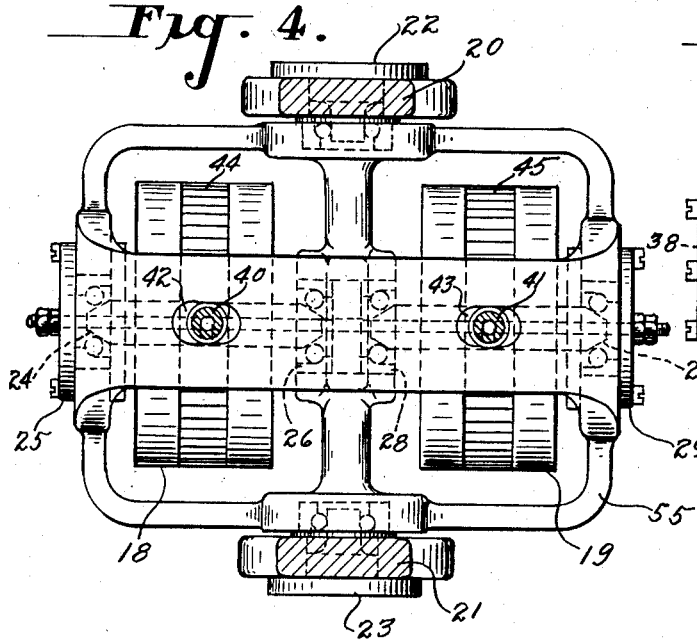
Figure 4 is a view in section taken along line 4—4 of Figure 1 showing the two gyros in top plan.
Figure 5:
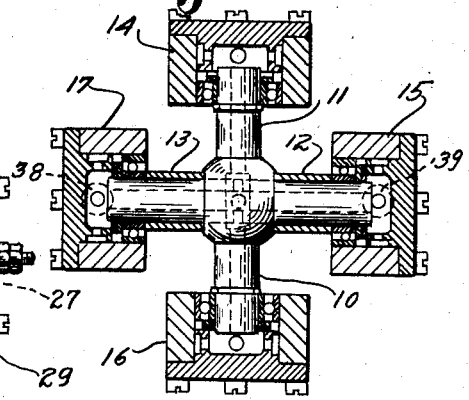
Figure 5 is a view in cross section taken along line 5—5 of Figure 1 showing the universal suspension joint.

The dial 3 may be adjustable by any conventional means such as shown in Figure 2 wherein there is provided a toothed ring 46 to mesh with the worm 47 supported in bearings 48 and 49 and carried by a shaft 50 to which is secured a hand crank 51 in order that the compass dial may be rotated with respect to the pointer 3 for the purpose of assuring a correct course.

I claim:

1. In a directional gyro, a housing, a support carried by said housing for pivotal movement about a normally vertical axis, a frame, bearing means pendulously suspending said frame from said support for universal movement about mutually normal, horizontal axes, a gimbal pivoted in said frame below said bearing means for pivotal movement about a normally horizontal tilt axis, two gyro rotors carried by said gimbal for spinning about a common normally horizontal axis normal to said tilt axis, jet means for spinning the respective rotors fixed to said frame, each jet means terminating adjacent its respective rotor in a vertical plane through the spin axis whereby, when the gimbal and rotors tilt relatively to the frame, the separation of the jets from the respective rotors is differentially varied, and relatively movable means carried by said support and housing for indicating the azimuthal position of said spin axis relatively to said housing.

2. In a directional gyro, a housing, a support carried by said housing for pivotal movement about a normally vertical axis, a frame, bearing means pendulously suspending said frame from said support for universal movement about mutually normal, horizontal axes, a gimbal pivoted in said frame below said bearing means for pivotal movement about a normally horizontal tilt axis, two gyro rotors carried by said gimbal for spinning about a common normally horizontal axis normal to said tilt axis, jet means for spinning the respective rotors fixed to said frame, each jet means terminating adjacent its respective rotor in a vertical plane through the spin axis whereby, when the gimbal and rotors tilt relatively to the frame, the separation of the jets from the respective rotors is differentially varied, and relatively movable means carried by said support and housing for indicating the azimuthal position of said spin axis relatively to said housing, a source of pressure lubricating fluid and passages therefor leading from said source through the bearings of said gyro suspension assembly and through said jets to constitute a force feed lubrication system and the driving means for spinning said rotors.

3. In a directional gyro, a housing, a support carried by said housing for pivotal movement about a normally vertical axis, a frame, bearing means pendulously suspending said frame from said support for universal movement about mutually normal, horizontal axes, a gimbal pivoted in said frame below said bearing means for pivotal movement about a normally horizontal tilt axis, two gyro rotors carried by said gimbal for spinning about a common normally horizontal axis normal to said tilt axis, jet means for spinning the respective rotors fixed to move with said frame, each jet means extending through a recess in said gimbal to permit relative movement therebetween and terminating adjacent its respective rotor in a vertical plane through the spin axis whereby, when the gimbal and rotors tilt relatively to the frame, the separation of the jets from the respective rotors is differentially varied, and relatively movable means carried by said support and housing for indicating the azimuthal position of said spin axis relatively to said housing.

4. In a directional gyro, a housing, a support carried by said housing for pivotal movement about a normally vertical axis, a frame, bearing means pendulously suspending said frame from said support for universal movement about mutually normal, horizontal axes, a gimbal pivoted in said frame below said bearing means for pivotal movement about a normally horizontal tilt axis, two gyro rotors carried by said gimbal for spinning about a common normally horizontal axis normal to said tilt axis, a pressure lubricating system for the bearing means, jet means connected to said lubricating system for spinning the respective rotors fixed to move with said frame, each jet means extending through a recess in said gimbal to permit relative movement therebetween and terminating adjacent its respective rotor in a vertical plane through the spin axis whereby, when the gimbal and rotors tilt relatively to the frame, the separation of the jets from the respective rotors is differentially varied, and relatively movable means carried by said support and housing for indicating the azimuthal position of said spin axis relatively to said housing.

BERT G. CARLSON.